United States Patent [19]
Fortune

[11] 3,815,843
[45] June 11, 1974

[54] SOLDERING MATERIALS DISPENSING APPARATUS

[76] Inventor: William S. Fortune, 14250 Dearborn St., Panorama City, Calif. 91402

[22] Filed: Jan. 2, 1973

[21] Appl. No.: 319,990

[52] U.S. Cl.............................. 242/96, 242/137.1
[51] Int. Cl...................... B65h 75/40, B65h 49/18
[58] Field of Search......... 242/137.1, 129, 96, 54 R, 242/134, 136

[56] References Cited
UNITED STATES PATENTS

| | | | |
|---|---|---|---|
| 633,404 | 9/1899 | Warburton | 242/136 |
| 2,479,710 | 8/1949 | Arnold | 242/137.1 |
| 2,499,130 | 2/1950 | Chase | 242/138 |
| 2,575,960 | 11/1950 | Huntington | 242/137.1 |
| 2,610,812 | 9/1952 | Epstein | 242/137.1 |

*Primary Examiner*—Leonard D. Christian
*Attorney, Agent, or Firm*—Daniel T. Anderson

[57] ABSTRACT

A molded, hand held dispenser for solder or other strand materials. The apparatus carries a plurality of replaceable, bobbin spools in a bobbin case body portion. A dispensing extension formed integrally therewith is provided with internal, strand guide means for dispensing the soldering materials through a snout portion of the extension. A molded cover plate for the dispensing extension portion is provided and includes retaining clip means for securing the ends of the strand materials when not in use. Similarly, a molded cover for the bobbin case portion is provided having an integral spindle for the bobbin spools.

4 Claims, 4 Drawing Figures

PATENTED JUN 11 1974 3,815,843
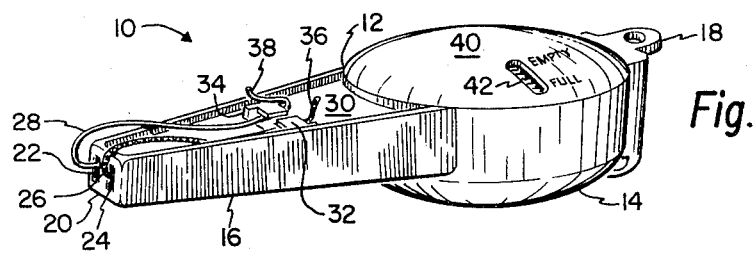
Fig. 1
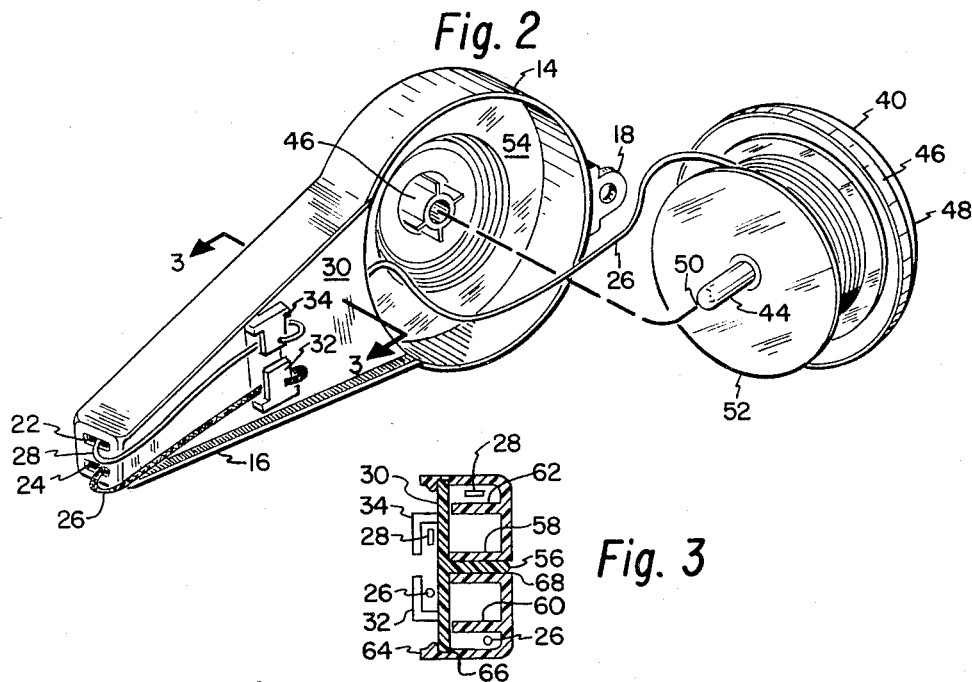
Fig. 2
Fig. 3
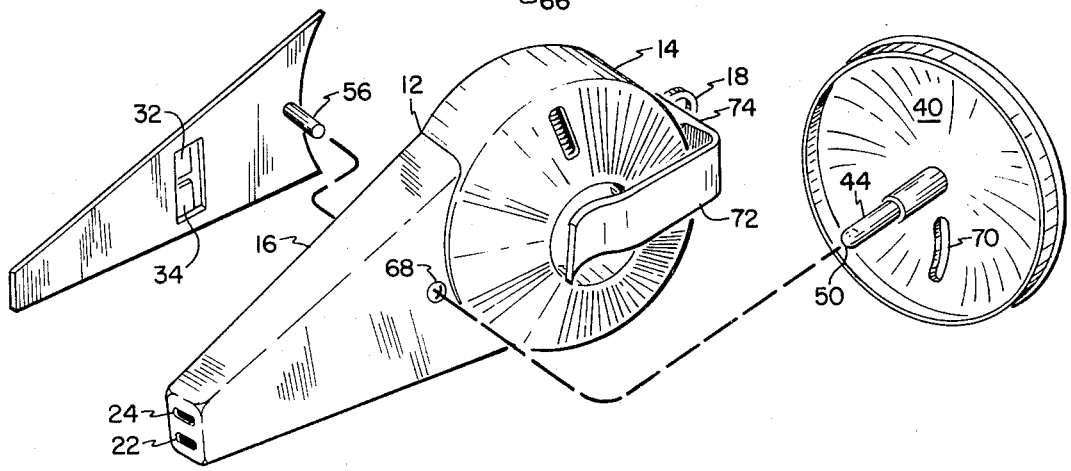
Fig. 4

SOLDERING MATERIALS DISPENSING APPARATUS

BACKGROUND OF THE INVENTION

1. Field of the Invention

This invention relates generally to the dispensing of strand materials and more particularly to a compact hand held, bobbin like combination for dispensing wire like materials. Although the invention finds particularly useful application in the field of soldering, desoldering, and rewiring in an electronics laboratory, maintainance shop, factory, or hobbyist's bench; and although in the course of brevity and clarity, much of the following discussion and description of examples of the invention are directed theretoward, it is expressly to be understood that the advantages of the invention are equally well manifest in other fields where it is desired to dipense strand or filament material as needed in a convenient manner and with minimum handling of the materials as they are stored for ready use and dispensed.

2. Description of the Prior Art

In the field of soldering and desoldering and resoldering, the operation of the soldering instrument must have a strand of solder or solder wicking material for application to the heated work surface such as a terminal post or a conductive portion of a printed circuit board or the like. In the past, these materials have typically been dispensed as needed from a relatively large supply spool. The difficulty and inconvenience of handling the spools without them rolling off the bench top and without directly handling the materials so as to contaminate the solders or the fluxed desolder wick braid are apparent. It is also apparent that uncontrolled unwinding of the materials from their spools, picking up, and handling the spools are severely aggravated by the fact that the operator must at the same time be handling and controlling, usually with rather critical precision, the extremely hot soldering implement.

Accordingly, it is an object of the present invention to provide a strand materials dispenser apparatus which is not subject to these and other limitations and disadvantages of the prior art.

It is another object to provide such apparatus which is contoured to rest comfortably and conveniently in the hand of the soldering iron operator while applying with precision the end of the strand material to the work surface.

It is another object to provide such apparatus which protects the strand material from contamination during its storage and use while nevertheless keeping the material always ready for instant use.

It is another object to provide such apparatus which is readily loaded and reloaded with various strand materials.

It is another object to provide such apparatus which is molded, readily mass produced, rugged and inexpensive.

It is another object to provide such apparatus which readily attaches to the shirt pocket or belt of the operator.

It is another object to provide such apparatus which includes visual gage means for instant determination of the remaining supply amount of strand material.

SUMMARY OF THE INVENTION

Briefly, these and other objects are achieved in accordance with the structural aspects of an example of the invention which includes body means for retaining a plurality of bobbin spools in a bobbin case portion of a molded body. Extending radially outwardly from the bobbin case portion is a strand support and guide extension portion through which the strand materials are fed as needed. A removable cover plate for the strand support and guide portion permits access for threading the strand materials through the support and guide portion after loading or reloading of the apparatus. A cover plate for the bobbin case portion is similarly removable for loading and reloading of the bobbin spools. A gage slot in the bobbin case cover plate as well as in the side of the bobbin case proper permits visual assessment of the quantity of supply on each of two materials spools therewithin. A pocket or belt clip may be affixed or integrally molded with the bobbin case body for ease in carrying the apparatus by the operator. In like manner, strand material end clips may be formed in the guide extension portion for retaining the ends of the strand material when not in use.

Further details of these and other novel features and their cooperation as well as additional objects and advantages of the invention will become apparent and be best understood from a consideration of the following description taken in connection with the accompanying drawing provided by way of illustrative example only.

BRIEF DESCRIPTION OF THE DRAWING

FIG. 1 is a side perspective view of an example of strand materials dispensing apparatus constructed in accordance with the principles of the present invention;

FIG. 2 is a frontal perspective view thereof in a partially disassembled arrangement;

FIG. 3 is a cross-sectional view of a portion of the structure illustrated in FIG. 2 taken along the reference lines 3—3 thereof;

FIG. 4 is a rear perspective view of the structure of FIG. 1 shown in further disassembled arrangement.

DETAILED DESCRIPTION OF PREFERRED EMBODIMENT

With specific reference now to the figures in detail, it is stressed that the particulars shown are by way of example and for purposes of illustrative discussion only and are presented in the cause of providing what is believed to be the most useful and readily understood description of the principles and structural concepts of the invention. In this regard, no attempt is made to show structural details of the apparatus in more detail than is necessary for a fundamental understanding of the invention. The description taken with the drawing will make it apparent to those skilled in the mechanical arts how the several forms of the invention may be embodied in practice. Specifically, the detailed showing is not to be taken as a limitation upon the scope of the invention which is defined by the appended claims forming, along with the drawings, a part of this specification.

In FIG. 1, the example of the dispensing apparatus 10 illustrated includes a molded body 12 having a spool retaining portion 14 and a wire guide extension portion 16 formed, in this example, integrally therewith. Also molded with the body 10 is a convenience hanger tab 18 for the storing or market displaying of the apparatus. The spool retaining portion 14 may be in the form essentially, of a short cylinder dimensioned to fit conveniently in the palm of the hand of the user; and the guide portion 14 may be a tapered, essentially pointed, extension to be straddled and grasped comfortably by the thumb and fingers of the same hand.

The tip end 20 of the guide extension portion is formed with a pair of small output openings 22, 24 through which the strand materials such as solder 26 and fluxed desoldering braid wick 28 may be drawn for use as desired. A cover plate 30 is provided having frictionally engaging edges for retention by the guide extension portion 16. Also illustrated in this example is a pair of retaining clips 32, 34, molded integrally with the cover plate 30, for securing the ends 36, 38 of the strand materials 26, 28.

A spool retainer cover member 40 is frictionally retained over the body portion 14, as indicated in more detail in subsequent figures, and may be provided with slot gage 42 to indicate visually the amount of material remaining on one of the bobbin spools contained within the body portion 14.

Referring to FIG. 2, the structure as described in connection with FIG. 1 is illustrated in a configuration showing the molded cover member 40 with its centrally disposed spindle extension 44 removed from retaining engagement with a spindle retainer socket 46 molded with the body portion 14. Also formed with the cover member 40 is a short cylindrical rim element 46 which fits within the cylindrical body of the spool retaining position 14. A retaining circular shoulder 48 is disposed peripherally about the cover member 40 and forms a substantially enclosing cover for the interior volume of the spool retainer portion of the body 12. When the spindle extension 44 is emplaced within the retainer socket 46, as in the configuration of FIG. 1, the tip end 50 thereof projects through the rear, body wall portion for cover ejection or removal purposes as discussed below.

FIG. 2 also illustrates the emplacement of a pair of strand materials supply spools in connection with the spool retainer portion of the body. A first supply spool 52 carries the solder material 26, is molded of transparent material for visual gaging of the supply remaining, and is disposed on the spindle extension 44. A second transparent spool 54, carrying a supply of solder wick material 28 is shown disposed over a hub formed by the spindle retainer socket 46. It may be noted that with the cover member 40 removed, as shown in FIG. 2, each of the spools is readily removable for replacement or resupply.

In FIG. 3, there is shown a cross sectional view of the apparatus taken through a retaining pin extension 56, molded with the cover plate 30, and its cooperative retainer socket 58 formed with the guide extension portion 16. A pair of wire guiding septa 60, 62 may also be molded with the body portion 16 to form guide channels along the length of the guide extension portion 16 for the solder and desoldering wick materials 26, 28, respectively. Also illustrated in FIG. 3 is a retaining rim 64 and shoulder 66 formed along the side walls of the guide extension portion 16 for containing, as shown, the cover plate 30.

Referring to FIG. 4, the cover plate 30 is shown removed from the guide extension portion 16 and its ejection removal, as indicated, is accomplished readily by the insertion of the tip end 50 of the spindle extension 44 of the cover member 40 into an opening 68, through the back wall of the guide extension portion 16, in register with the pin retainer socket 58 (see FIG. 3). A slot gage 70 for the material supply on the spool 52, removed in FIG. 4, is formed in the wall of the cover member 40. When the cover member 40 is properly emplaced for use, as in the configuration of FIG. 1, its tip end 50 projects through a hole in the back or bottom wall of the spool container portion 14 under a pocket or belt clip element 72 whereby when the clip 72, being bend resilient, is pressed inwardly, the cover element 40 is ejected from the body portion 14. The clip element 72 may be molded separately and then press fitted into a clip retaining socket 74 as shown.

In operation, wire materials may be drawn by pulling them as needed through the supply openings 22, 24 at the tip end 20 of the guide extension portion 16. As the material is pulled, it unwinds from the consequently revolving supply spools or bobbins 52, 54.

When the material supply of either of the spools is indicated as depleted, the belt-pocket clip 72 may be pushed in to eject the cover element 40 thusly releasing the spools 52, 54. In turn, the cover plate 30 may be ejected by insertion of the spindle end 54 into the opening 68. Once the new replenished supply spool or spools are emplaced, their strands may be laid in their respective guide channels in the guide extension portion 16 and threaded through their respective supply openings 22, 24. Then both cover members 30, 40 may be emplaced for dispensing use of the apparatus as desired.

There has thus been disclosed and described an example of a wire strand dispenser apparatus which achieves the objects and exhibits the advantages set forth hereinabove.

What is claimed is:

1. Wire solder dispenser combination comprising:
 a molded body including a spool retainer portion and a dispensing guide extension portion, said spool retainer portion being of the character to contain at least one supply bobbin spool of a relatively thin torroidal configuration and including means for retaining said spool with a degree of rotational freedom about a predetermined axis, and further including frictional, spindle socket means disposed contiguously about said predetermined axis, said dispensing guide extension portion being molded integrally with said spool retainer portion with the internal portions thereof being in wire passing communication with each other and being formed to provide a substantially rigid wire guide portion extending away from said spool retainer portion in a direction substantially perpendicular to said spool axis and having a tip end portion through which said wire solder may be pulled from said at least one supply bobbin spool;
 a molded spool retainer portion cover member having a bobbin spindle portion of the character to be frictionally, removably retained by said spindle socket means, said cover member and its spindle portion defining, in cooperation with said spool retainer portion of said body, a substantially enclosed space for said at least one supply bobbin spool; and a molded extension portion cover member of the character to be frictionally retained by said dispensing guide extension portion of said body defining in cooperation therewith a substantially enclosed space for guiding said wire solder material.

2. The invention according to claim 1 which includes bend resilient, pocket-belt clip means having a base end and in which said molded body further includes clip retaining socket means for connecting with said base end of said clip means to form cooperatively with said body a resilient clip for grasping the belt or pocket edge of the user.

3. The invention according to claim 1 in which at least one of said body and said spool retainer portion cover member is formed to include gage window means of the character and disposed to indicate the amount of wire solder material remaining on at least one of said at least one supply spool.

4. The invention according to claim 1 in which said guide portion cover member is formed to include wire end clip means for frictionally retaining the end of said wire solder materials.

* * * * *